Patented Apr. 22, 1952

2,593,911

UNITED STATES PATENT OFFICE 2,593,911

DIAZOTYPES CONTAINING A CONDENSATION PRODUCT OF DICYANDIAMIDE WITH FORMALDEHYDE AND A SALT OF AMMONIA OR AN AROMATIC AMINE

Fred W. Neumann, Nazareth, and William W. Williams, Easton, Pa., assignors to General Aniline & Film Corporation, New York, N. Y., a corporation of Delaware No Drawing. Application December 31, 1948, Serial No. 68,726

8 Claims. (Cl. 95—6)

This invention relates to diazotype photoprinting materials and the method of making the same.

It is an object of this invention to provide diazotype photoprinting material yielding copies of increased fastness to washing and in its preferred embodiments, also having increased stability to background discoloration.

Diazotype photoprinting material comprises a light sensitive layer, generally supported on a backing or carrying material such as paper, film, foil, e. g. of regenerated cellulose, organic derivatives of cellulose or resins, metal, glass or the like, the light sensitive layer containing a light sensitive diazo compound. In positive diazotype photoprinting materials, the light sensitive diazo compound is of the type which is decomposed by light to render it incapable of coupling with azo coupling components, so that after exposure to light of locally varied intensity, e. g. by exposure under line drawings or photographic diapositives to be reproduced, an image can be developed by causing the residual diazo compound to couple with an azo coupling commonent. In two-component layers of this type, the azo coupling component is included together with the light sensitive diazo compound in the layer, which is stabilized against premature coupling, and development is effected by alkaline treatment, e. g. by exposure to an alkaline vapor such as ammonia or a volatile basic organic nitrogen compound; or if desired, by treatment with an aqueous alkaline solution such as aqueous ammonium hydroxide, sodium carbonate or trisodium phosphate. In one-component systems, the azo coupling component is not contained in the light sensitive layer, but is applied in the developing solution, e. g. in conjunction with an alkaline material to promote coupling.

Other diazotype processes employ layers sensitized with light sensitive diazo compounds wherein the image can be developed in other ways. Thus, in the case of light sensitive diazo sulfonates, development by coupling with an azo coupling component may be effected by exposure to heat or steam. Horeover, diazotype images can also be formed by self-coupling of a partly decomposed residual diazo compound with its photo decomposition products in the areas exposed to light, or by oxidation of the phenolic compounds or quinones formed by partial decomposition of the diazo compound in the light exposed areas. In such cases, negative images are obtained.

In all of the foregoing diazotype processes or systems, insufficient fastness of the image coloration to washing presents considerable diffculty, not only when the azo color components include water-solubilizing groups, such as sulfo or carboxyl groups, but also when such groups are absent. Inferior fastness to washing of the diazotype image seriously limits the classes of components available for image formation and often prevents satisfactory production of desired colors or color combinations in copies which are destined to be subjected to wet treatment. Moveover, decomposition products and residual image-forming components in most diazotype photoprinting materials tend to cause darkening of the background areas, especially on exposure to light and atmospheric conditions, impairing the clearness and the general appearance of the copy.

Other difficulties often encountered in diazotype photoprinting material lie in providing sensitized layers which are stable during storage under atmospheric conditions against decomposition or premature coupling of the sensitizing components, resulting in loss in sensitivity and discoloration of the resulting copies; further, in providing material of sufficient photo-sensitivity to require a relatively short exposure to light, and which is rapidly and readily developed; and also in providing material of which the image coloration is fast to light and air.

Various treatments have been proposed to remedy one or more of the aforesaid difficulties. For example, incorporation of adjuvants in the diazotype sensitizing composition or layer, prior to exposure and development, or during or after development, has been proposed to increase the fastness of the image to washing and also to prevent background discoloration. Many of these treatments which improve one of the desired characteristics of the photoprinting material or copies prepared therefrom, impair other properties and increase difficulties of the type referred to above. Thus, adjuvants improving the fastness to washing of the image some times cause a substantial increase in background discoloration, or reduction in photo-sensitivity of the material, impair the stability of the unexposed material in storage, interfere with the development, prevent the formation of dense clear images, or may impair the light fastness of the image.

We have discovered that the fastness of diazotype images, especially in positive diazotype materials and especially of the two-component type, to washing or treatment with water can be materially improved, not only in the case of images in which the color-forming components contain water-solubilizing groups (COOH, $SO_3H$ and the like), but also when such groups are absent, by incorporating in the light sensitive layer a water-soluble condensation product of dicyandiamide with formaldehyde and with a salt of the class consisting of ammonium salts and aromatic primary and secondary amine salts having at least one unoccupied position in o- or p-position to the amino group. Moreover, we have found that the aforesaid condensation products which are prepared from dicyandiamide and formaldehyde with an ammonium salt produce a substantial improvement in the stability of the background to discoloration by light and air in the resulting copies. The ammonium salt condensation products therefore constitute a preferred class of materials for use in accordance with this invention. The aforesaid condensation products which are prepared from aromatic amine salts, however, do not adversely affect the stability of the background to discoloration.

In other respects, the condensation products incorporated in the photoprinting materials of this invention are highly satisfactory. Thus, when the condensation products are incorporated in light sensitive diazotype layers, they have no injurious effect on the photo-sensitivity of the layer, nor upon the stability to decomposition, discoloration or premature coupling in storage, nor upon the ease of development. Moreover, they produce no substantial change in the shade, intensity or light fastness of the image coloration, nor do they cause any discoloration of the background initially formed on the copies. The inclusion of the aforesaid condensation products in the diazotype coating tends to minimize the tendency of the individual diazotype components to migrate prior to print production (whereby degraded shades often result, especially in black-line formulations).

A preferred condensation product of our invention can be prepared by mixing dicyandiamide with aqueous (e. g. 36–40%) formaldehyde and with an ammonium salt such as ammonium chloride, in a mol ratio of about 2:4:1, and heating the mixture at about 90–100° C. for about 4 to 5 hours; the water-soluble condensation product can be recovered by precipitation with methanol and separation from the reaction mixture.

Preparation of a condensation product for use in accordance with our invention, including an aromatic amine salt, can be conveniently carried out, for example, by reacting the aromatic amine hydrochloride with somewhat more than an equimolecular amount (e. g. about 1.2 molecular equivalents) of aqueous formaldehyde (e. g. 36–40% solution) at room temperature, and then adding an approximately equimolecular amount of dicyandiamide to the solution, and heating at boiling temperatures under reflux for about 4 hours. The product can be precipitated by rendering the solution alkaline and it can then be separated from the reaction mixture. The precipitate thus obtained is advantageously converted to a water-soluble salt by treatment with an acid such as acetic, butyric, hydrochloric, or citric acids, acetic acid having been found especially convenient for the purposes of this invention.

Instead of employing dicyandiamide alone in the foregoing procedures, a portion thereof, e. g. up to about 50-mol per cent, can be replaced by thiourea or related compounds such as thiobiuret, thiocarbamyl guanidine, or thiocarbamylurea.

The condensation products of this invention are incorporated in diazotype light sensitive layers by precoating or preimpregnation of the base or support material such as paper, films, or other materials above mentioned, with an aqueous solution of the condensation product in a concentration, for example, of 1 to 20% and after drying, applying a diazotype sensitizing composition containing a light sensitive diazo compound. Alternatively, the condensation products can be added to the sensitizing solution, e. g. in the aforesaid concentrations, and the composition thereupon applied to a base and dried. When the condensation products are incorporated in the sensitizing solutions, it is sometimes desirable to heat the solutions to about 50° C. to avoid separation of the condensation product or combinations thereof with other ingredients of the solution.

The condensation products of this invention are especially useful in preparing two-component positive diazotype photoprinting materials, in which the light sensitive diazo component is incorporated together with an azo coupling component in the light sensitive layer, the latter being stabilized against coupling prior to exposure and development. The sensitizing composition is moreover, preferably of the type which yields a positive image of an original upon exposure to light by reason of the fact that the diazo compound is partly or completely decomposed so as to render it incapable of coupling upon exposure to light. The improved fastness to washing resulting from the improvements of the present invention are particularly effective in the case of sensitizing compositions of which the diazo or coupling component contains a water-solubilizing group such as a carboxylic or sulfonic acid group.

Preparation of two-component positive diazotype photoprinting material in accordance with this invention is illustrated in the following examples, wherein parts and percentages are by weight.

*Example 1*

White paper was precoated with a solution, in 100 parts of water, of 10 parts of a condensation product prepared by reacting together 15 parts of dicyandiamide, 5 parts of ammonium chloride, and 25 parts of 37% aqueous formaldehyde solution at 90–100° C. for several hours as described above, and isolating the condensation product by precipitation with methanol. The paper was dried for a few minutes at 50° C., and then coated with a sensitizing solution having the following composition:

3 parts p-(N-methyl-N-β-hydroxyethyl-amino)-benzene diazonium chloride zinc chloride double salt
2 parts resorcinol
1 part isopropanol
5 parts ethylene glycol
5 parts zinc chloride
5 parts thiourea
5 parts citric acid
100 parts water After drying, the sensitized paper was exposed to light under an original to be reproduced, and developed by exposing the material to ammonia vapor. A print was thereby obtained which showed an outstanding improvement in fastness to washing, as evidenced by a test involving wetting the print with water, as compared with similar prints prepared with paper sensitized with the foregoing composition but without precoating the paper with the dicyandiamide condensation product. Upon exposure to actinic light in a fadeometer, prints prepared with the paper containing the condensation product of the invention preserved their white background without appreciable discoloration, while the background in prints prepared for comparison with the same sensitizing composition but without the dicyandiamide condensation product became decidedly yellow upon similar treatment.

As a further comparison, prints prepared with paper sensitized with the foregoing sensitizing composition, but which contained phenyl biguanide instead of the dicyandiamide condensation product of this invention, were similarly exposed to actinic light in a fadeometer. The background of the resulting prints also became decidedly yellow under these conditions.

*Example 2*

White paper was precoated with the dicyandiamide condensation product and was sensitized and tested as described in Example 1, except that instead of employing 2 parts of resorcinol in the sensitizing composition, 2 parts of rescinol-4-ammonium sulfonate were used as the azo coupling component. An even greater improvement in fastness to washing was observed in the prints prepared with the precoated paper as compared with control prints similarly sensitized but containing no condensation product in accordance with this invention, or containing phenyl biguanide instead of said condensation products. Similarly, in a comparative test for background discoloration by exposure of the prints to actinic light, the prints containing the dicyandiamide condensation product were found to be stable against background discoloration, while the control prints prepared without the condensation product or with phenyl biguanide instead, acquired discolored backgrounds to approximately an equal extent.

*Example 3*

White paper was precoated with a solution, in 100 parts of water, or 4 parts of the condensation product employed in Example 1. After drying at 50° C., the paper was coated with a solution having the following composition:

3.5 parts p-diethylaminobenzene diazonium chloride zinc chloride double salt
2 parts resorcinol-4-ammonium sulfonate
1 part isopropanol
5 parts thiourea
5 parts zinc chloride
5 parts ethylene glycol
5 parts citric acid
100 parts water After drying the paper and exposing to light under an original to be reproduced, a copy was developed by treatment with ammonia vapor, whereby a brown image was formed. Comparative tests were made in the same manner as in the preceding examples to test the wash-fastness of the copy containing the dicyandiamide condensation product, with copies similarly made, except that the paper did not contain such a condensation product. Considerable bleeding of the coloration occurred in the prints containing no dicyandiamide condensation product, while the print prepared in accordance with this invention showed no line bleeding of the image. The density of the coloration, initial whiteness of the background and fastness of the coloration to fading when exposed to light were substantially the same in the printing containing the condensation product and the control print without this material.

Instead of 4 parts of the dicyandiamide condensation product, 1 part can be used in the precoating solution of this example to obtain a substantial improvement in the fastness to washing of the resulting copies, although the fastness to washing is not as complete as when 4 parts are used as described above.

*Example 4*

White paper was precoated with a solution similar to that of Example 1 containing 10 parts of the dicyandiamide condensation product in 100 parts of water. After drying, the resulting paper was sensitized with a sensitizing solution similar to that of Example 3, except that 2 parts of R-salt (2-hydroxynaphthalene-3,6-disodium sulfonate) was used instead of the resorcinol-4-ammonium sulfonate as the azo coupling component. A purplish-blue image was obtained upon exposing to light under an original to be reproduced, and developing by treatment with ammonia vapor.

In similar manner, a series of copies were prepared according to the procedure of Example 3, except that the following azo coupling components were substituted for the resorcinol -4-ammonium sulfonate in the sensitizing composition:

1 part 1-(3′-sulfophenyl)-3-methylpyrazolone-5
1 part meta-sulfoacetoacetanilide
2 parts 2,3-dihydroxynaphthalene-6-sulfonic acid
2 parts 4,6-disulforesorcinol The colorations of the prints produced with these couplers were maroon, orange, blue and reddish-purple, respectively.

Each of the sensitizing compositions of this example were similarly applied to paper without the precoating step described above, and prints were likewise prepared with the resulting photoprinting material for control purposes. In each case, the shade and depth of the image was similar in the prints containing the dicyandiamide condensation product and those which did not contain this material. In comparative tests of fastness to washing, little or no line bleeding occurred in the prints containing the dicyandiamide condensation product, while substantial line bleeding occurred in the control prints containing none of the condensation product.

*Example 5*

White paper was coated with a solution having the following composition, at a temperature of 50° C.:

3.5 parts p-diethylaminobenzene diazonium chloride zinc chloride double salt
1 part α-resorcylamide
8 parts dicyandiamide condensation product of Example 1
1 part isopropanol
5 parts ethylene glycol
5 parts citric acid
5 parts thiourea
5 parts zinc chloride
0.1 part saponin
100 parts water After drying, the paper was exposed to light under an original to be reproduced and the image developed by treatment with ammonia vapor as in the preceding examples. Prints of a deep maroon shade were obtained having good fastness to washing, whereas prints of very much inferior wash-fastness were obtained with paper sensitized with the foregoing sensitizing solution in which the condensation product of Example 1 was omitted.

Upon substituting 1.8 parts of resorcinol instead of α-resorcylamide in the foregoing sensitizing composition, brown prints were obtained which likewise showed very little line bleeding upon wetting with water, while a control print similarly prepared, without the condensation product of Example 1, showed substantial line bleeding.

A similar improvement in fastness to washing was obtained by substituting 3.5 parts of p-(N-methyl-N-β-hydroxyethyl-amino) benzene diazonium chloride zinc chloride double salt, or upon substituting 2.5 parts of p-dimethylamino-o-carboxy-benzene diazonium chloride zinc chloride double salt for the p-diethylaminobenzene diazonium chloride zinc chloride double salt of this example, employing either α-resorcyl amide or resorcinol in the sensitizing composition.

*Example 6*

White paper, precoated with an aqueous solution of the condensation product of Example 1, was dried and coated with a solution having the following composition:

2 parts resorcinol-4-ammonium sulfonate
2.5 parts 4-monoethylamino-3-methyl benzene diazonium chloride zinc chloride double salt
1 part ethanol
5 parts ethylene glycol
5 parts citric acid
5 parts thiourea
5 parts zinc chloride
0.1 part saponin
100 parts water Upon drying the resulting paper and exposing to light under an original, and developing with ammonia vapor, red-brown prints were obtained having excellent fastness to washing as compared with control prints similarly obtained with paper sensitized with the same solution described above but containing no dicyandiamide condensation product. On exposure of the prints to actinic light, the background of those containing the dicyandiamide condensation product was not discolored, while the background of the prints containing no dicyandiamide condensation product were substantially discolored.

A similar improvement in fastness to washing and stability against background discoloration was observed in comparative tests of paper prepared as described above in this example, except that instead of 4-monoethylamino-3-methyl benzene diazonium chloride zinc chloride double salt, a similar amount of the zinc chloride double salt of 4(N-ethyl-N-β-hydroxyethyl-amino)-3-methyl benzene diazonium chloride zinc chloride double salt was used, the image in the latter case having reddish-violet shade.

Likewise, corresponding improvement in fastness to washing was observed upon incorporating 2 parts of 4-benzoylamino-2,5-diethoxy benzene diazonium chloride zinc chloride double salt, 6 parts of citric acid and 2 parts of boric acid in the above described sensitizing composition instead of 2.5 parts of the ethylamino-methyl benzene diazonium compound, 5 parts of citric acid and 5 parts of zinc chloride employed above, whereby the resulting sensitized material yielded an image having a brownish-maroon shade.

*Example 7*

White paper was precoated with an aqueous solution containing 10% of a condensation product of approximately equimolecular amounts of aniline hydrochloride, dicyandiamide and formaldehyde, as described in the paragraphs preceding the examples, acetic acid being used to render the resulting condensation product soluble in water. After drying, the paper was sensitized with the composition of Example 3 containing p-diethylaminobenzene diazonium chloride zinc chloride double salt and resorcinol-4-ammonium sulfonate as the diazo and coupling components. After drying, the paper was exposed to light under an original and developed as in the preceding examples, while at the same time, a paper prepared with the same sensitizing composition but containing no condensation product of dicyandiamide was similarly exposed and developed. Brown prints of excellent image color depth and of white background were obtained with the material containing the dicyandiamide condensation product as well as with the control sample. However, the fastness to washing of the image in the print containing the dicyandiamide condensation product was greatly improved as compared with the fastness to washing of the control print.

A similar improvement in fastness to washing was obtained in a similar comparative test in which the same dicyandiamide condensation product and sensitizing composition was employed, except that instead of using the p-diethylaminobenzene diazonium compound and resorcinol-4-ammonium sulfonate, N-methyl-N-β-hydroxyethyl-aminobenzene diazonium chloride zinc chloride double salt and resorcinol were used.

Instead of incorporating the azo coupling component in the sensitizing layer, as illustrated in the foregoing examples, the coupling component can be omitted from the sensitizing composition and included instead in an aqueous alkaline developing solution containing alkaline-reacting materials such as sodium carbonate, trisodium phosphate, ammonium hydroxide or triethanolamine, said solution being applied to the photoprinting material after exposure to light, whereby coupling of the residual diazo compound with the azo coupling component in the developing solution occurs. A similar improvement in the fastness to washing and stability of the background to discoloration is obtained as described in the examples.

The dicyandiamide condensation products of this invention can also be incorporated in diazotype materials or in the sensitized layers containing them, where the sensitizing components are of other types, e. g. the diazo sulfonates and negative diazotype materials of the self-coupling or oxidation type. The fastness to washing and to background discoloration is improved in the same way as in the materials described in the examples.

The condensation products of this invention can be applied to a base such as paper in concentrations of about 1–20% in aqueous solution, prior to application of the diazo sensitizing solution or by inclusion in said solution, and are effective to produce the improvements noted above merely by drying the resulting photoprinting material. As indicated in the foregoing discussion, the condensation products of this invention are made by reacting dicyandiamide, a portion of which may be replaced by a thiourea compound (which term, as employed herein, includes thiourea and related thiocarbamyl derivatives such as thiocarbamyl guanidine, thiocarbamylurea, and thiobiuret), preferably with ammonium salts or alternatively, with a salt of an aromatic primary or secondary amine having at least one of the positions o- and p- to the amino group unoccupied, by heating with formaldehyde in aqueous solution. Suitable aromatic amines for preparing the latter type of condensation product are those having the formula:

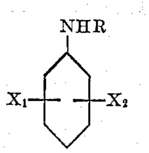

wherein R is a member of the group consisting of hydrogen, alkyl groups (e. g. methyl, ethyl), and aryl groups (e. g. phenyl), $X_1$ is a member of the group consisting of hydrogen, alkyl (methyl, ethyl), aryl (phenyl, tolyl), halo (bromo, chloro or fluoro), haloalkyl (trifluoromethyl), alkoxy (methoxy, ethoxy), aryloxy (phenoxy), and nitro groups, i. e. non-salt-forming, non-water-solubilizing substituents; and $X_2$ is a member of the group consisting of the same values as $X_1$ and in addition, a bivalent chain forming a condensed ring system with a benzene ring, e. g. forming a naphthalene or quinoline nucleus.

Primary and secondary amines corresponding to the foregoing formula are exemplified by aniline, α- and β-naphthylamine, 2- and 3-toluidines, xylidin, 2- and 3-anisidine, 3-phenoxyaniline, 2- and 3-aminobiphenyl, 2-chloroaniline, 3-chloro-2-toluidine, 2,5-dichloroaniline, 2- and 3 - nitroaniline, N - ethyl - 5 - nitrotoluidine, N-methyl-2-nitraniline, diphenylamine, 2-nitrodiphenylamine, and 2-chlorodiphenylamine. Of the foregoing amines, the mononuclear aromatic primary amines having an unoccupied p-position are preferred.

The relative proportions of the reagents employed in preparing the dicyandiamide condensation products of our invention are preferably such that at least one mol and preferably in excess of one mol of formaldehyde is used per mol of dicyandiamide, and at least one-half mol of ammonium salt or aromatic amine salt is employed for the aforesaid amounts of the other reagents. Condensation of formaldehyde and dicyandiamide or a mixture of the latter with a thiourea compound, is effected with ammonium- or the aforesaid aromatic amine-salts of acids which are preferably strong mineral acids, e. g. nitric and hydrochloric acids, or if desired, organic acids such as acetic acid. The products employed are polymeric and may be considered as resins although they are soluble in water as distinguished from fully resinified compositions obtained, for example, by heating the condensation products at elevated temperatures, generally in the absence of water.

While compounds containing guanidines and related materials have been used heretofore for improving the fastness to washing of dyestuffs applied to textiles, particularly acid cotton dyestuffs, the effect of the dicyandiamide condensation products of this invention in diazotype photoprinting materials for improving the fastness to washing of the images produced is surprising since known fixing agents for acid dyes such as phenyl guanidine or decoxyphenyl biguanide, when employed in diazotype photoprinting materials tend to increase discoloration of the background upon exposure of the resulting prints to actinic light, whereas the condensation products of this invention do not impair the background stability, or in the case of the preferred ammonium salt condensation products, increase the stability of the background to discoloration. At the same time, the condensation products of this invention have no other injurious effect on the photoprinting material or upon the prints or images made therewith.

The light sensitive diazo compounds of the preferred sensitizing compositions employed in conjunction with the dicyandiamide condensation products of this invention are preferably diazotized p-phenylene diamine compounds in which one of the amino groups contains a substituent preventing diazotization thereof, such as an alkyl (ethyl, methyl), hydroxyalkyl (β-hydroxyethyl), or acyl (benzoyl), and the like groups, and wherein the benzene nucleus can be otherwise unsubstituted, or can contain such nuclear substituents as halogen (chlorine, bromine, fluorine), alkyl (methyl, ethyl), carboxyl and alkoxy (methoxy, ethoxy) groups, preferably in 2- and 5- position with respect to the diazotizable amino group.

The coupling components employed are preferably polyhydric phenols (naphthols) and 1-aryl pyrazolones or acetoacetanilides which may contain nuclear sulfo or carboxyl groups, e. g. resorcinol, phloroglucinol, resorcinol mono- and disulfonic acids, sulfoacetoacetanilide, R-salt, 2,3-dihydroxysulfonic acids and 1-(m-sulfophenyl)-3-methylpyrazolone-5.

In addition, the sensitizing solutions, especially two-component compositions, can contain stabilizers, buffers, anti-oxidants, metal salts, wetting agents, penetrants, and solvent assistants, such as thiourea, sulfobenzoic acid, mellitic acid, citric acid, tartaric acid, acetic acid or formic acid, zinc chloride, ethylene glycol, water-soluble lower alcohols, saponin, and similar adjuvants which are commonly included in sensitizing compositions to provide desired stability against premature coupling, color stability and the like.

Variations and modifications which will be obvious to those skilled in the art can be made in the details of this invention without departing from the scope or spirit thereof.

We claim:

1. Diazotype photoprinting material having a light sensitive layer containing a light sensitive diazo compound, and a water-soluble condensation product of formaldehyde with dicyandiamide and with a member of the group consisting of salts of ammonia and of aromatic amines.

2. Diazotype photoprinting material having a light sensitive layer containing a light sensitive diazo compound, and a water-soluble condensation product of formaldehyde with a mixture of dicyandiamide and a thiourea compound, the latter constituting not more than one-half of said mixture, and with a member of the group consisting of salts of ammonia and of aromatic amines.

3. Diazotype photoprinting material as defined in claim 1, wherein the light sensitive diazo compound is of the p-phenylene diamine series.

4. Diazotype photoprinting material as defined in claim 3, wherein the light sensitive layer further contains an azo coupling component.

5. Diazotype photoprinting material having a light sensitive layer containing a light sensitive diazo compound of the p-phenylene diamine series, and a water-soluble condensation product of formaldehyde with dicyandiamide and ammonium chloride.

6. Diazotype photoprinting material having a light sensitive layer containing a light sensitive diazo compound of the p-phenylene diamine series, and a water-soluble condensation product of formaldehyde with dicyandiamide and aniline hydrochloride.

7. Diazotype photoprinting material as defined in claim 5, wherein the light sensitive layer further contains an azo coupling component.

8. Diazotype photoprinting material as defined in claim 6, wherein the light sensitive layer further contains an azo coupling component.

FRED W. NEUMANN.
WILLIAM W. WILLIAMS.

REFERENCES CITED

The following references are of record in the file of this patent:

UNITED STATES PATENTS

| Number | Country | Date |
|---|---|---|
| 1,807,761 | Sprongerts | June 2, 1931 |
| 2,317,184 | Dreyfuss | Apr. 20, 1943 |